United States Patent
Chang et al.

(10) Patent No.: US 7,007,175 B2
(45) Date of Patent: Feb. 28, 2006

(54) MOTHERBOARD WITH REDUCED POWER CONSUMPTION

(75) Inventors: Nai-Shung Chang, Taipei Hsien (TW); Chia-Hsing Yu, Taipei Hsien (TW); Chia-Hsin Chen, Taipei (TW)

(73) Assignee: VIA Technologies, Inc., Taipei Hsien (TW)

( * ) Notice: Subject to any disclaimer, the term of this patent is extended or adjusted under 35 U.S.C. 154(b) by 663 days.

(21) Appl. No.: 10/005,627

(22) Filed: Dec. 4, 2001

(65) Prior Publication Data

US 2002/0144166 A1 Oct. 3, 2002

(30) Foreign Application Priority Data

Apr. 2, 2001 (TW) .............................. 90107847 A

(51) Int. Cl.
 *G06F 1/26* (2006.01)
(52) U.S. Cl. ...................................... 713/300; 713/320
(58) Field of Classification Search ................ 713/300, 713/320
 See application file for complete search history.

(56) References Cited

U.S. PATENT DOCUMENTS

| | | | |
|---|---|---|---|
| 4,835,737 A * | 5/1989 | Herrig et al. ................ 710/302 |
| 5,283,514 A * | 2/1994 | Hayward et al. ............ 323/280 |
| 5,635,852 A * | 6/1997 | Wallace ........................ 326/30 |
| 5,705,922 A * | 1/1998 | VanDyke ..................... 323/354 |
| 5,918,023 A * | 6/1999 | Reeves et al. ............... 710/301 |
| 6,084,813 A * | 7/2000 | Kikuchi et al. .............. 365/222 |
| 6,343,363 B1 * | 1/2002 | Maher et al. ................ 713/324 |
| 6,351,827 B1 * | 2/2002 | Co et al. ........................ 714/42 |
| 6,356,096 B1 * | 3/2002 | Takagi et al. ................ 324/765 |
| 6,449,166 B1 * | 9/2002 | Sly et al. ..................... 361/760 |
| 6,453,421 B1 * | 9/2002 | Taylor ......................... 713/300 |
| 6,480,030 B1 * | 11/2002 | Taguchi ....................... 326/86 |
| 6,665,736 B1 * | 12/2003 | Fan ................................ 710/2 |
| 2001/0012726 A1 * | 8/2001 | O'Neal et al. ........... 439/540.1 |

\* cited by examiner

*Primary Examiner*—Lynne H. Browne
*Assistant Examiner*—Tse Chen
(74) *Attorney, Agent, or Firm*—J.C. Patents

(57) ABSTRACT

A motherboard with reduced power consumption is disclosed. The motherboard has a memory module slot, a DDR termination array, and a control chip. The DDR termination array couples to the memory module slot and provides a termination resistor that has one terminal coupled to a voltage source. The control chip provides a control signal. When the motherboard enters a power saving mode or before the memory module being inserted in the memory module slot, the control signal gives an indication to the DDR termination array for cutting off the connection between the termination resistor and the memory module slot. A switch and several termination resistors may substitute the DDR termination array as requirements. The control chip provides the control signal to open the switch and therefore cuts off the connections between termination resistors and the voltage source to achieve the power-conserving purpose.

15 Claims, 4 Drawing Sheets

MOTHERBOARD WITH REDUCED POWER CONSUMPTION

CROSS-REFERENCE TO RELATED APPLICATION

This application claims the priority benefit of Taiwan application serial no. 90107847, filed on Apr. 2, 2001.

BACKGROUND OF THE INVENTION

1. Field of the Invention

The invention relates in general to a motherboard of a computer system, and more particularly, the invention relates to a motherboard with reduced power consumption.

2. Description of the Related Art

A normal computer system is basically built with a motherboard, interface cards and peripherals. The motherboard is the base of the computer system, which usually contains a controller chip set, several slots for installing the interface cards, a central processing unit (CPU) and several memory module slots for accommodating the memory modules. A user can install his memory modules offered from different manufacturers with different numbers according to specific requirements, wherein a memory module is typically consisted of several memory devices.

The memory used in a normal computer such as the synchronous dynamic random access memory (SDRAM) operates to control data access in response to the rising edges of the system clock signals. The double data rate (DDR) dynamic random access memory can operate to control the data access on both the rising and falling edges of the system clocks. The DDR DRAM has advantage of performing at the double access rate in comparison with the conventional DRAM due to the upgraded memory access speed.

Modem motherboard systems further comprise a power saving mode. The operation of the DDR DRAM requires a $V_{TT}$ voltage source and several termination resistors to absorb signal reflections from the address, the control and the data signal buses. However, the termination resistors are not isolated from connecting with the voltage source when the conventional computer system enters the power saving mode or before the DDR DRAM module being inserted into the memory module slot. Conventional design for the motherboard system while employing the DDR DRAM obviously consumes powers unnecessarily.

FIG. 1 is a block diagram showing a motherboard of a conventional desktop computer, wherein the motherboard comprises several DDR DRAM memory slots. The address, control and data signal buses of the computer have to connect associated termination resistors to absorb signal reflections for insuring signal transmission qualities on above-mentioned buses when the motherboard of the desktop computer employs DDR DRAM.

Some laptop computer motherboards include DDR SDRAM chips directly soldered onto their motherboards. The soldered memory chips are located near the north bridge chip, so that the signal quality is good even without connecting any termination resistor. However, additional expanded DDR DRAM slots have to connect to termination resistors to prevent signals from poor quality. Although signal transmission quality can be improved after the address, control and data signal buses connect with associated termination resistors, these termination resistors still connect to the voltage source even no DDR DRAM module is inserted in the expanded slot or when a power saving mode is activated. The above two conditions are obviously power-consumptive.

SUMMARY OF THE INVENTION

A Taiwan patent application no. 90100488 related to the invention is incorporated herein. The related patent application provides a motherboard that accommodates either a SDRAM or a DDR DRAM. When the DDR DRAM is detected, the termination resistors can be connected. However, the termination resistors are not connected. A further consideration to motherboard design of laptop computers should be given especially that an available clock enable signal is provided for design in laptop ones.

The principal object of the invention is to disclose a power-conserving motherboard that meets the requirements of the double data rate dynamic random access memory (DDR DRAM). When the DDR DRAM module is inserted into the disclosed motherboard under a normal operation mode, a voltage source and termination resistors are connected with the above memory module to reduce energy waste.

The other object of the invention is to disclose the power-conserving motherboard adapted to a laptop computer that has the advantage of power conservation to lengthen working interval.

The motherboard with reduced power consumption in the embodiment comprises a memory module slot, a DDR termination array and a control chip. The memory module slot is used to connect with a memory module including a DDR DRAM. The DDR termination array couples to the memory module slot to control selectively several termination resistors connected between a voltage source and the memory module slot according to a control signal. The control chip couples to the memory module slot and the DDR termination array and provides the control signal. When the motherboard enters the power saving mode or before the memory module being inserted into the memory module slot, the control signal commands the DDR termination array to cut off the connection between the termination resistors and the memory module slot. The control chip includes a north bridge chip. The control signal comprises a clock enable signal. The motherboard can be used in a laptop computer.

The DDR termination array comprises several signal terminals, switches and termination resistors, wherein the signal terminals are coupled to the corresponding signal buses of the memory module slot. Each of the switches has a first terminal, a second terminal and a control terminal and each of the first terminals is connected to an associated signal terminal. The termination resistors are connected between the voltage source and the second terminal of the switch. It is worth noting that the control terminals are used to receive the control signal to turn on and off the switches.

Another embodiment of the DDR termination array is also disclosed in the invention that comprises several signal terminals, a switch and termination resistors. The signal terminals are coupled to the signal buses of the memory module slot. The switch comprises a first terminal, a second terminal and a control terminal. The first terminal is coupled to the voltage source and the termination resistors are coupled between the corresponding signal terminal and the second terminal of the switch. Similarly, the control terminal receives the control signal to drive the switch to turn on or off.

The invention provides another motherboard with reduced power consumption that comprises a memory module slot, several termination resistors, a switch, and a control chip. The memory module slot connects a memory module that includes a DDR DRAM. Each of the termination resistors has a first terminal and a second terminal. The first terminals of the termination resistors are coupled to associated signal terminals of the memory module slot, and the second terminals thereof are connected to a first terminal of the switch, wherein the second terminal of the switch further couples to the voltage source. The control chip is coupled between the memory module slot and the switch and provides a control signal. When the motherboard enters a power saving mode, or when no memory module is inserted in the memory module slot, the control signal drives the switch to open itself for cutting off the connection between the termination resistors and the voltage source. The control chip includes a north bridge chip, and the control signal includes a clock enable signal. The motherboard can be used in a laptop (notebook) computer.

The invention further provides an operation method for the disclosed motherboard that comprises a memory module slot and a termination resistor. Furthermore, the termination resistor, the memory module slot and the voltage source together form an operation circuitry. The operation method comprises the following steps. When the motherboard enters the power saving mode or before the memory module is inserted into the memory module slot, the operation circuitry will be cut off according to the indication of a control signal. When the motherboard returns to a normal operation mode and the memory module is inserted into the memory module slot, the operation circuitry will be connected for operations according to the indication of the control signal.

The cutting-off and connecting operations mentioned above is achieved by respectively cutting off and establishing associated connections between the termination resistors and the memory module slots or between the termination resistors and relative voltage source.

Both the foregoing general description and the following detailed description are exemplary and explanatory only and are not restrictive of the invention, as claimed.

DESCRIPTION OF THE PREFERRED EMBODIMENTS

Figure 1:
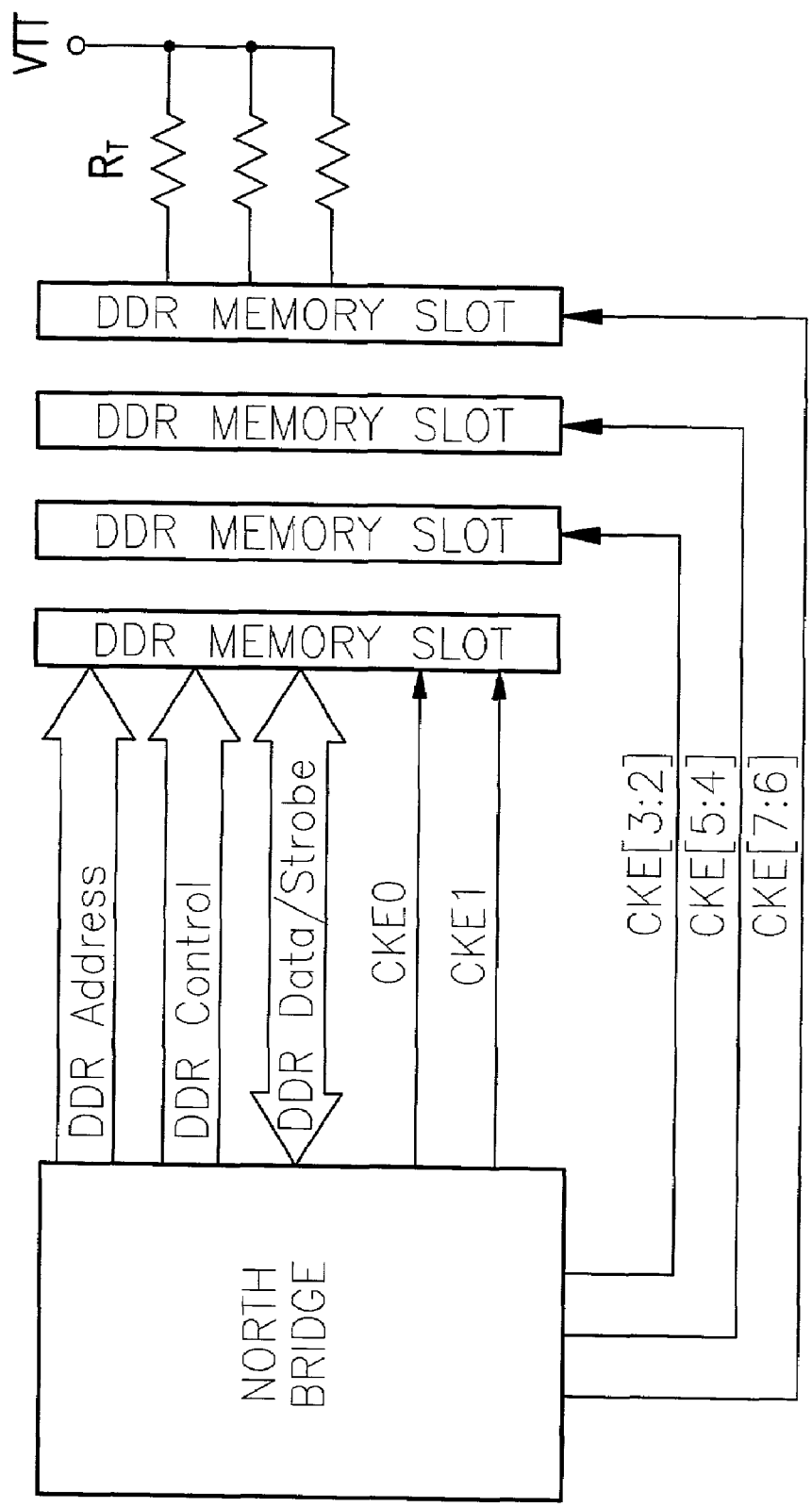
FIG. 1 is a block diagram showing a conventional motherboard of a desktop computer.
Figure 2:
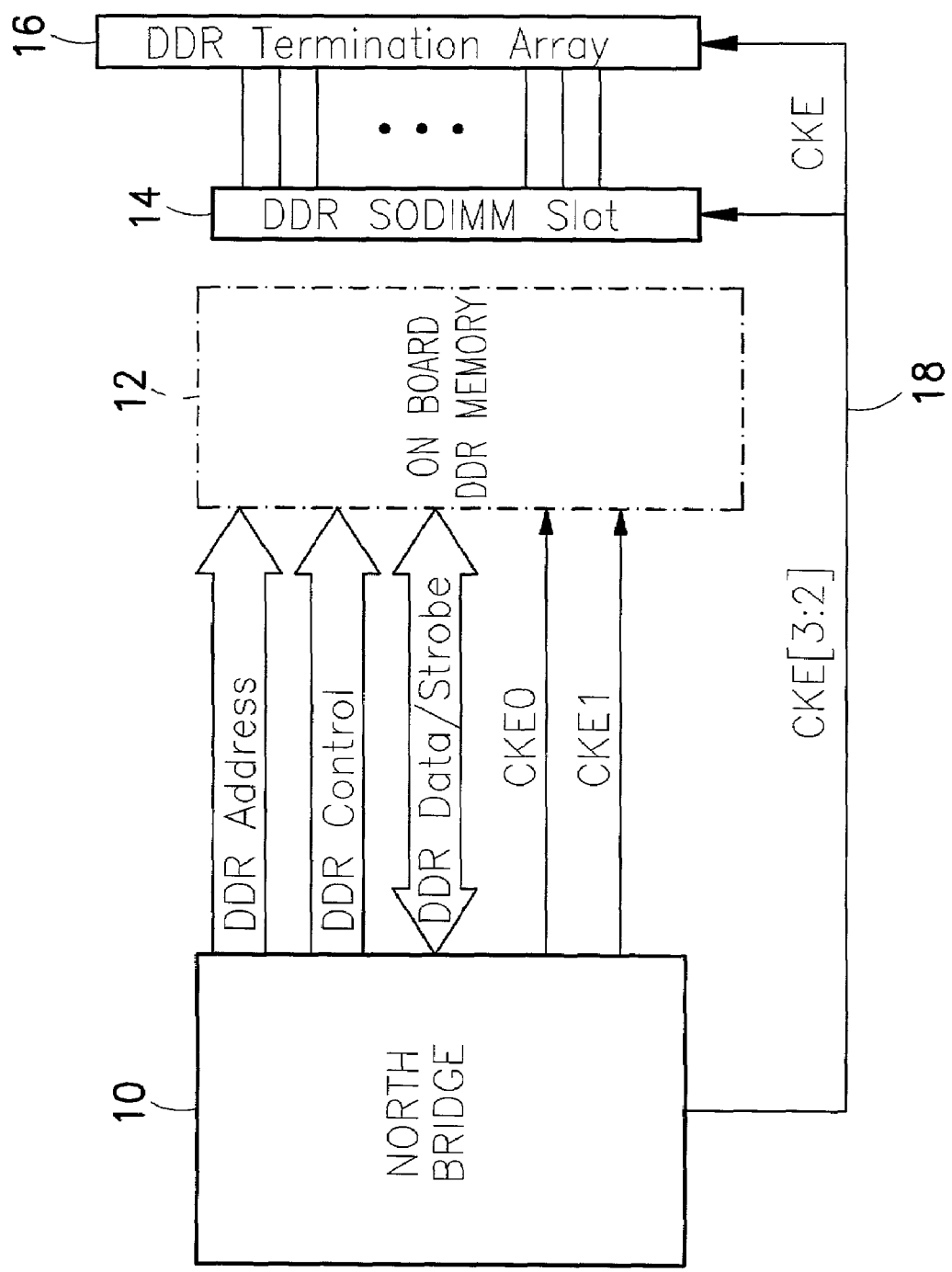
FIG. 2 is a block diagram showing a motherboard with reduced power consumption provided by the invention.

FIG. 2 shows an embodiment of a motherboard with reduced power consumption provided by the invention. In the embodiment, a motherboard applied to a laptop computer comprises an on board DDR DRAM chips 12 (that is, a memory module), a memory module slot (e.g., DDR SODIMM (Small Outline Dual Inline Memory Module) slot) 14, a DDR termination array 16 and a system controller chip set 10. The memory module slot 14 is coupled to a memory module that comprises a double data rate DRAM (DDR DRAM). The DDR termination array 16 couples to the address, control and data signal buses of the memory module slot 14 to provide required termination resistors. Every provided termination resistor has one terminal coupled to the voltage source. Since the memory module 12 of the motherboard has a good signal quality even without using the termination resistor, the memory module 12 does not have to connect to the DDR termination array 16. The controller chip set 10 such as a north bridge chip provides a control signal 18 (e.g., clock enable signal CKE [3:2] in laptop computers) and couples to the memory module 12, the memory module slot 14 and the DDR termination array 16. When the motherboard enters a power saving mode or before the memory module is not inserted into the memory module slot 14, the control signal 18 will disable the DDR termination array 16 and cut off the connection between the termination resistors and the memory module slot 14. In the invention, the controller chip set 10 uses the control signal to drive the DDR termination array 16 being switched between the enable and disable states, so that the DDR termination can determine whether the termination resistors are provided. When the motherboard enters the power saving mode or before the memory module is inserted into the memory module slot 14, the controller chip set 10 disables the DDR termination array 16 by delivering proper indication via the control signal 18. The power conservation purpose is achieved while DDR termination array 16 terminates the connection of associated termination resistors. When the motherboard enters the normal operation mode and a memory module is inserted into the memory module slot 14, the controller chip set 10 enables the DDR termination array 16 to provide termination resistors for connections based on the indication of control signal 18. Some of the controller chip sets 10, especially those used in laptop computers, comprise sequence enable pins. When entering the power saving mode, the sequence enable pins may be employed to deliver a sequence enable signal so that the inserted memory module may go into the power saving mode based on the indication of the sequence enable signal. Therefore the control signal of the controller chip set 10 may be replaced by the sequence enable signal in the embodiment.

Figure 3:
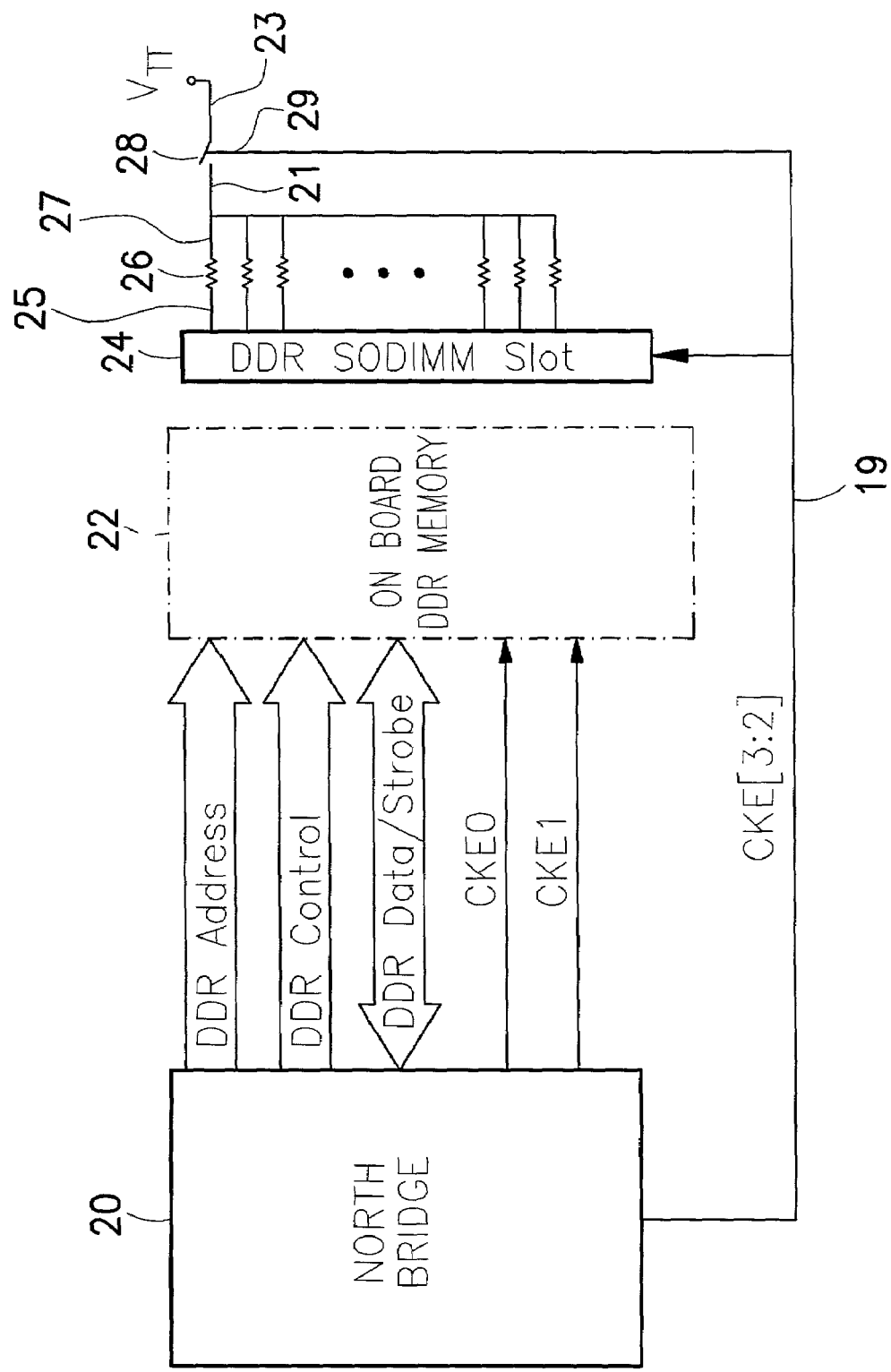
FIG. 3 is a block diagram showing another motherboard with reduced power consumption according to the invention.

FIG. 3 shows another embodiment of a motherboard with reduced power consumption according to the present invention. The motherboard comprises a memory module 22, a memory module slot 24, a plurality of termination resistors 26, a switch 28, and a controller chip set 20. The memory module slot 24 connects with the memory module 22 that further comprises a DDR DRAM. Each of the termination resistors has a first terminal 25 and a second terminal 27 that the first terminal 25 further couples to the address, control and data signal buses of the memory module slot 24. The switch 28 has a first terminal 21, a second terminal 23 and a control terminal 29, wherein the second terminal 27 connects to the first terminal 21 of the switch 28 and the second terminal 23 couples to the voltage source. The controller chip set 20 couples to the memory module slot 24 and the switch 28 and provides a control signal 19. When the motherboard enters a power saving mode or before the memory module 22 being inserted into the memory module slot 24, the control signal 19 is used to open the switch 28 and therefore to disconnect the termination resistor 26 and the voltage source. The invention uses the control signal 19 from the controller chip set 20 to control the conduction of the switch 28 and achieves the power conservation purpose. The control signals 19 from the controller chip set 20 may be delivered with the sequence enable pins.

Figure 4:
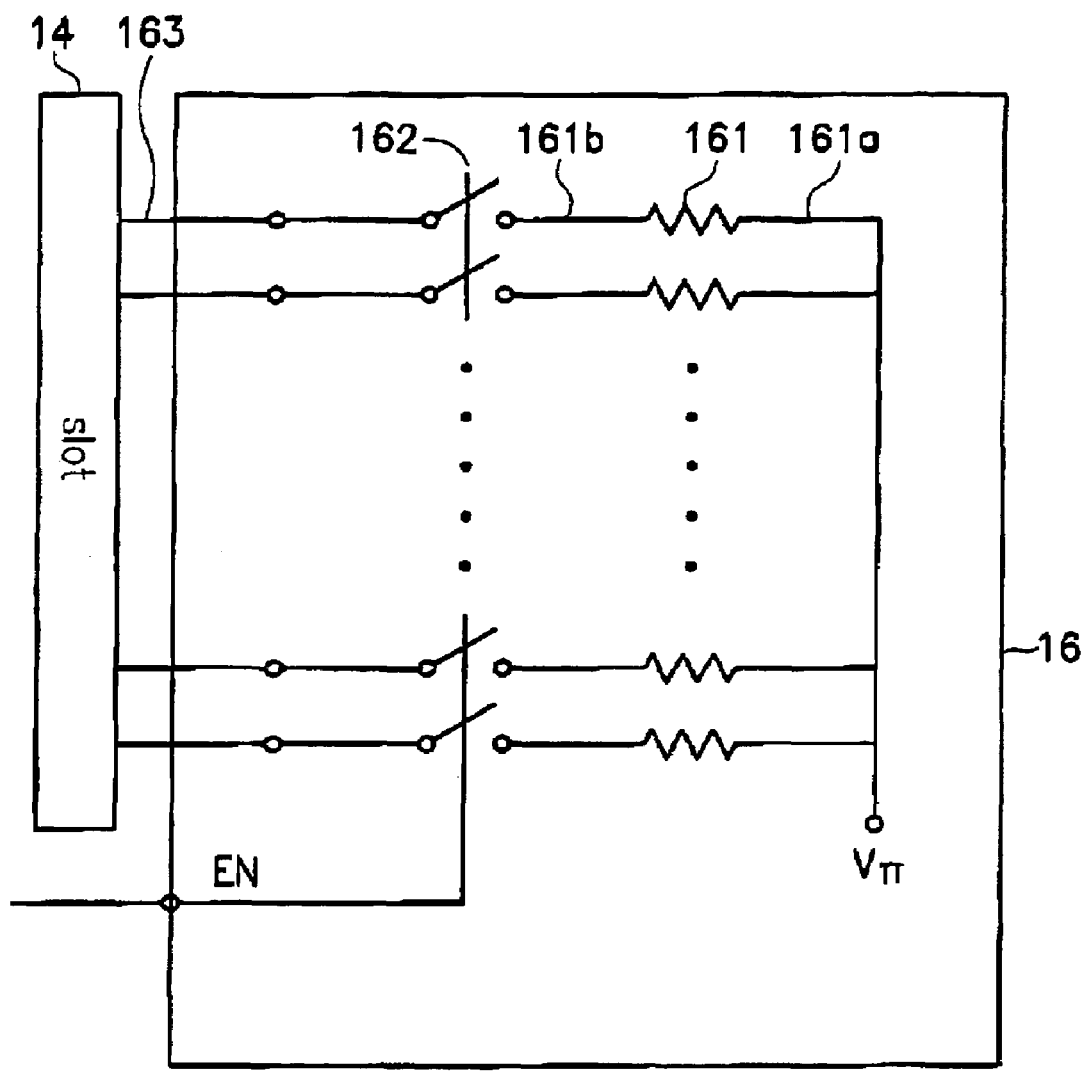
FIG. 4 shows a schematic drawing of a DDR termination array.

FIG. 4 shows the schematic drawing of the DDR termination array of the present invention, which comprises a plurality of resistors 161, a plurality of signal terminals 163, a plurality of switches 162 and an enable pin EN. Each of the resistors 161 has a first terminal 161a and a second terminal 161b. The first terminals 161a respectively connect with the voltage source $V_{TT}$, so that the resistors are functioned as termination resistors. The second terminals 161b connect with relative signal terminals 163 via switches 162. Each switch in the embodiment has a first terminal, a second terminal and a control terminal. All the first terminals connect with their corresponding signal terminals, respectively. The control terminals are coupled to the enable pin EN that is used to determine whether all the switches are conducted or not. When the enable pin delivers an enable state, the switches are conducted and signals can be output from the signal terminals. When the enable pin EN delivers a disable state, the switches are open to prevent signals from being output from associated signal terminals. The switches can be established by using transmission gates.

The above DDR termination array 16 has a second configuration that includes a plurality of signal terminals, a switch and a plurality of termination resistors. The signal terminals couple to their relative signal buses of the memory module slot. The switch of the second configuration has a first terminal, a second terminal and a control terminal, wherein the first terminal couples with the voltage source and the termination resistors together. Similarly, the control terminal is used to receive the control signal to achieve the purpose of turning on and off of the switch.

The invention also provides an operation method for the disclosed motherboard that further comprises a memory module slot and a termination resistor, wherein the termination resistor and the voltage source together form an operation circuitry. The operation method comprises the following steps. The operation circuitry will be cut off from the memory module slot according to the indication of a control signal when the motherboard goes into the power saving mode or before the memory module is inserted into the memory module slot. When the motherboard returns to a normal operation mode and the memory module is inserted into the memory module slot, the operation circuitry will be connected to the memory module slot for operations according to the indication of the control signal. The cutting-off and connecting operations mentioned above is achieved by respectively cutting off and establishing associated connections between the termination resistors and the memory module slots or between the termination resistors and relative voltage source.

According to the invention, a motherboard with reduced power consumption is provided. The motherboard uses the current pins and components to achieve the objective of reduce power consumption without additional volumes and pins. The invention can be applied to a laptop computer that may work for people longer than before due to the advantage of power conservation, which offer a solution for those people in travel to upgrade their performance more conveniently and effectively.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A motherboard with reduced power consumption, comprising:
    a memory module slot for receiving a memory module therein;
    a DDR (Double data rate) termination array, coupled between the memory module slot and a voltage source, comprising a plurality of termination resistors connected to the voltage source and a plurality of switches between the plurality of termination resistors and the memory module slot, wherein the plurality of switches controlling connections between the memory module slot and the termination resistors are controlled according to a control signal; and
    a controller chip set, coupled to the memory module slot and the DDR termination array, providing the control signal, wherein when the motherboard enters a power saving mode, or before the memory module is inserted into the memory module slot, the control signal opens the plurality of switches to cut off the coupling between the memory module slot and the termination resistors and thus to cut off the coupling between the slot and the voltage source; and wherein in connection, the plurality of termination resistors are coupled to the memory module in the memory module slot through the plurality of switches.

2. The motherboard according to claim 1, wherein the control signal includes a clock enable signal.

3. The motherboard according to claim 1, wherein the memory module comprises a double data rate dynamic random access memory (DDR DRAM).

4. The motherboard according to claim 1, wherein the motherboard is used in a laptop computer.

5. The motherboard according to claim 1, wherein the controller chip set comprises a north bridge chip.

6. The motherboard according to claim 1, wherein the DDR termination array further comprises:
    a plurality of signal terminals, coupled between the memory module slot and the plurality of switches.

7. A motherboard with reduced power consumption, comprising:
    a memory module slot for receiving a memory module;
    a plurality of termination resistors, coupled to the memory module slot;
    a switch, coupled between the plurality of termination resistors and a voltage source, on/off of the switch being controlled by a control signal; and
    a controller chip set, coupled to the memory module slot and the switch to provide the control signal, wherein when the motherboard enters a power saving mode or when the memory module is not inserted in the memory module slot, the control signal commands the switch to cut off the connection between the termination resistors and the voltage source; and wherein in connection, the voltage source is coupled to the memory module in the memory module slot via the switch and the plurality of termination resistors.

8. The motherboard according to claim 7, wherein the control signal comprises a clock enable signal.

9. The motherboard according to claim 7, wherein the memory module comprises a double data rate dynamic random access memory (DDR DRAM).

10. The motherboard according to claim 7, wherein the motherboard is used in a laptop computer.

11. The motherboard according to claim 7, wherein the controller chip set comprises a north bridge chip.

12. An operation method of a motherboard with reduced power consumption, wherein the motherboard comprises a memory module slot for receiving a memory module and a plurality of termination resistors, the termination resistors and a voltage source form an operation circuit, the operation method comprising:

using a control signal to cut off a connection between the memory module and the operation circuit when the motherboard enters a power saving mode or when the memory module slot is not inserted with the memory module; and using the control signal to establish the connection between the memory module slot and the operation circuit when the motherboard enters a normal operation mode and when the memory module slot is inserted with the memory module.

13. The operation method according to claim 12 wherein the cutting off step comprises a step of cutting off connections between the termination resistors and the memory module slot.

14. The operation method according to claim 12, wherein the cutting off step comprises a step of cutting off connections between the termination resistors and the voltage source.

15. The operation method according to claim 12, wherein the control signal is a clock enable signal provided by a laptop computer.

* * * * *